2,826,577

ALKYLENEBIS BENZOXAZINES

Raymond H. Rigterink, Midland, Mich., assignor to The Dow Chemical Company, Midland, Mich., a corporation of Delaware No Drawing. Application May 6, 1957
Serial No. 657,065

7 Claims. (Cl. 260—244)

This invention is concerned with benzoxazine compounds having the formula

In this and succeeding formulae, $m$ is an integer from 2 to 6, inclusive, and R represents a member of the group consisting of the radicals having the formulae

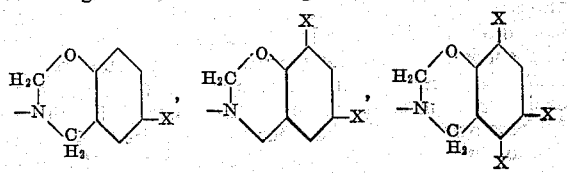

and

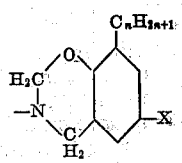

wherein $n$ is an integer from 1 to 4, inclusive, and X is bromine or chlorine. These new compounds are crystalline solids somewhat soluble in many common organic solvents and of very low solubility in water. They are useful as parasiticides and are adapted to be employed as an active toxic constituent of liquid and dust compositions for the control of many undesirable organisms such as *Alternaria solani*.

The new compounds may be prepared by causing a reaction between an alkylenediamine having the formula

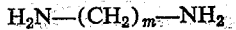

and formaldehyde, or a suitable formaldehyde yielding substance, to form an intermediate formaldehyde-amine condensation product. The latter product is then caused to react with a phenolic compound having the formula

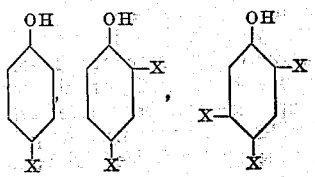

and

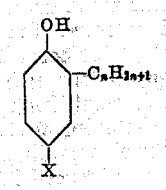

to form the desired product and water of reaction.

In carrying out the first step of the reaction, the alkylenediamine is intimately contacted with formaldehyde in an inert solvent, such as methanol, ethanol or dioxane, as a reaction medium. The contacting is carried out with stirring and cooling and at a temperature of from 0° to 70° C. Good results are obtained when employing one molecular proportion of the diamine with four molecular proportions of formaldehyde. The formaldehyde may be employed in any readily available form such as formalin, trioxane, paraformaldehyde, etc. The amount of formaldehyde is calculated on the basis of a monomer unit.

In carrying out the second step of the reaction, the phenolic compound or a solution thereof in one of the above named solvents is added portionwise to the reaction mixture prepared as described above. In such operations, two molecular proportions of the phenol are employed for each molecular proportion of diamine used in the preparation of the intermediate formaldehyde-amine product. The reaction takes place smoothly at the temperature range of from 30° to 100° C. During the reaction, the desired product oftentimes precipitates from the reaction mixture. Upon completion of the reaction, the reaction mixture may be cooled to precipitate the desired product or to precipitate further product. The precipitated product may be separated in conventional manner such as by filtration or decantation and purified by recrystallization from a suitable organic solvent.

The following examples illustrate the invention but are not to be construed as limiting:

*Example 1.* — 3,3' - ethylenebis(6 - chloro - 3,4 - dihydro - 8 - methyl - 2H - 1,3 - benzoxazine)

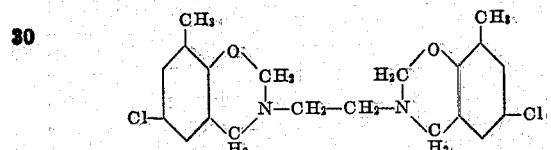

Sixty grams of paraformaldehyde (equivalent to two moles of HCHO), 1.0 gram of potassium hydroxide and 300 milliliters of methanol were mixed together and the resulting mixture heated with stirring to the boiling temperature to obtain a clear solution. The reaction vessel and contents were then cooled to room temperature and 30.0 grams (0.5 mole) of ethylenediamine added portionwise to the reaction mixture over a period of about 15 minutes. The addition was carried out with stirring and cooling and at a temperature of from 25° to 30° C. Upon completion of the addition, 142.6 grams (1.0 mole) of 4-chloro-o-cresol was slowly added with stirring and the resulting mixture heated at the boiling temperature (65° C.) and under reflux for 2 hours. During the heating, a 3,3' - ethylenebis(6 - chloro - 3,4 - dihydro - 8 - methyl - 2H - 1,3 - benzoxazine) product precipitated in the reaction mixture as a crystalline solid. This product was recovered by filtration, washed with aqueous 10 percent sodium hydroxide, and recrystallized from ethyl acetate. The recrystallized product was found to melt at 163°–165° C.

*Example 2.* — 3,3' - ethylenebis(5,6,8 - trichloro - 3,4 - dihydro - 2H - 1,3 - benzoxazine)

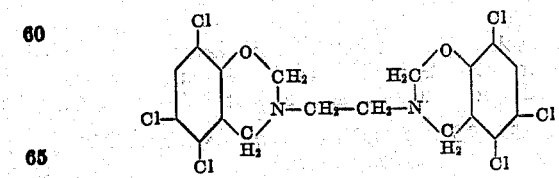

Sixty grams of paraformaldehyde (2.0 mole equivalents of HCHO), 1.0 gram of potassium hydroxide and 300 milliliters of methanol were mixed together and the resulting mixture heated with stirring to the boiling temperature to obtain a clear solution. The reaction vessel and contents were then cooled to room temperature and 30.0 grams (0.5 mole) of ethylenediamine added portionwise to the reaction mixture over a period of about 15 minutes. The addition was carried out with stirring and cooling and at a temperature of from 25° to 30° C. Upon completion of the addition, 197.5 grams (1 mole) of 2,4,5-trichlorophenol was slowly added portionwise to the reaction mixture with stirring and the resulting mixture heated at the boiling temperature (65° C.) and under reflux for about 15 minutes. During the heating period, a 3,3'-ethylenebis-(5,6,8-trichloro-3,4-dihydro-2H-1,3-benzoxazine) product precipitated in the reaction mixture as a crystalline solid. This product was separated by filtration, washed with water and recrystallized from ethyl acetate. The recrystallized product was found to melt at 170°–171° C.

*Example 3.—3,3'-ethylenebis(6,8-dichloro-3,4-dihydro - 2H - 1,3 - benzoxazine)*

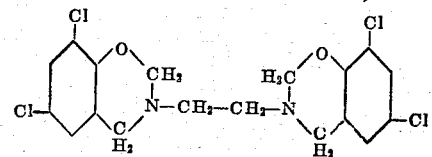

Sixty grams of paraformaldehyde (2.0 mole equivalents of HCHO), 1.0 gram of potassium hydroxide and 300 milliliters of methanol were mixed together and the resultmixture heated with stirring to the boiling temperature to obtain a clear solution. The reaction vessel and contents were then cooled to room temperature and 30.0 grams (0.5 mole) of ethylenediamine added portionwise to the reaction mixture over a period of 15 minutes. The addition was carried out with stirring and cooling and at a temperature of from 25° to 30° C. Upon completion of the addition, 163 grams (1 mole) of 2,4-dichlorophenol was added portionwise with stirring and the resulting mixture heated at the boiling temperature (65° C.) and under reflux for two hours. During the heating period, a 3,3'-ethylenebis(6,8 - dichloro - 3,4 - dihydro - 2H - 1,3 - benzoxazine) product precipitated in the reaction mixture as a crystalline solid. Upon completion of the heating period, the product was recovered by filtration and recrystallized from chlorobenzene. The recrystallized product melted at 210°–212° C.

*Example 4.—3,3'-ethylenebis(6-chloro-3,4-dihydro-2H-1,3-benzoxazine*

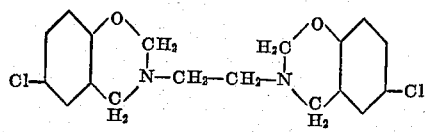

Ethylenediamine (30.0 grams; 0.5 mole) was added portionwise over a period of 15 minutes to an admixture of sixty grams of paraformaldehyde (2.0 mole equivalents of HCHO), 1.0 gram of potassium hydroxide and 150 milliliters of methanol. The addition was carried out with stirring and cooling and at a temperature of from 25° to 30° C. Upon completion of the addition, 128.6 grams (1.0 mole) of 4-chlorophenol was added to the reaction mixture with stirring and the resulting mixture thereafter heated at the boiling temperature (65° C.) and under reflux for two hours. During the heating period, a 3,3'-ethylenebis(6 - chloro - 3,4 - dihydro - 2H - 1,3 - benzoxazine) product precipitated in the reaction mixture as a crystalline solid. The precipitated solid was recovered by filtration and recrystallized from chlorobenzene. The recrystallized product was found to melt at 177°–179.5° C.

*Example 5.—3,3'ethylenebis(6-bromo-3,4-dihydro-2H-1,3-benzoxazine)*

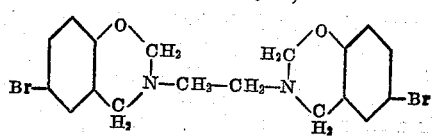

Ethylenediamine (30.0 grams; 0.5 mole) was added portionwise over about a 15-minute period to an admixture of sixty grams of paraformaldehyde (2.0 mole equivalents of HCHO), 1.0 gram of potassium hydroxide and 300 milliliters of methanol. The addition was carried out with stirring and cooling and at a temperature of from 25° to 30° C. Upon completion of the addition, 173.0 grams (1 mole) of 4-bromophenol was added to the reaction mixture with stirring and the resulting mixture heated at the boiling temperature (65° C.) and under reflux for two hours. During the heating period a 3,3'-ethylenebis(6-bromo-3,4-dihydro-2H-1,3-benzoxazine) product precipitated in the reaction mixture as a crystalline solid. The solid precipitate was recovered by filtration and recrystallized from chlorobenzene. The recrystallized product was found to melt at 183.5°–185.5° C.

*Example 6.—3,3'-hexamethylenebis(6-chloro-3,4-dihydro-2H-1,3-benzoxazine)*

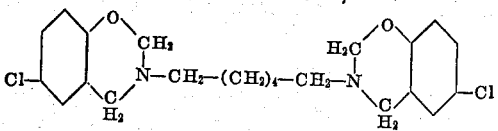

Sixty grams of paraformaldehyde (equivalent to two moles of HCHO), 1.0 gram of potassium hydroxide and 250 milliliters of methanol were mixed together and heated with stirring to the boiling temperature to obtain a clear solution. The reaction vessel and contents were then cooled to room temperature and 58 grams (0.5 mole) of 1,6-hexamethylenediamine added portionwise to the reaction mixture over a period of about 0.25 hour. The addition was carried out with stirring and cooling and at a temperature of from 25° to 30° C. Upon completion of the addition, 128.6 grams (1.0 mole) of 4-chlorophenol was slowly added with stirring and the resulting mixture heated at the boiling temperature (65° C.) and under reflux for 2 hours. The resulting solution was heated under reduced pressure to remove the solvent and the residue diluted with 250 milliliters of toluene. The toluene mixture was washed with aqueous 10 percent sodium hydroxide and the resulting mixture heated under reduced pressure to remove the toluene and water and to obtain a 3,3'-hexamethylenebis(6 - chloro - 3,4 - dihydro - 2H - 1,3 - benzoxazine) product as an oily liquid residue. 3,3'-hexamethylenebis(6 - chloro - 3,4 - dihydro - 2H - 1,3 - benzoxazine) has a molecular weight of 417.0.

In a similar manner as the foregoing examples, other 3,3'-alkylenebis(3,4-dihydro-2H-1,3-benzoxazines) may be prepared as follows:

3,3' - trimethylenebis(8 - tertiary - butyl - 6 - chloro-3,4-dihydro-2H-1,3-benzoxazine) by reacting trimethylenediamine, formaldehyde and 2-tertiarybutyl-4-chlorophenol.

3,3' - ethylenebis(6 - bromo - 3,4 - dihydro - 8 - propyl - 2H-1,3-benzoxazine) by reacting 4-bromo-2-propylphenol, formaldehyde and ethylenediamine.

3,3' - tetramethylenebis(6,8 - dibromo - 3,4 - dihydro - 2H-1,3-benzoxazine) by reacting 2,4-dibromophenol, formaldehyde and 1,4-tetramethylenediamine.

The new compounds have been tested and found effective as parasiticides. For such use, the products may be dispersed on an inert finely divided solid and employed as dusts. Also such mixtures may be dispersed in water with the aid of a wetting agent, and the resulting aqueous suspensions employed as sprays. In other procedures, the products may be employed as constituents of oil-in-water emulsions, or water dispersions with or without the aid of wetting, dispersing or emulsifying agents. In a representative operation, 3,3'-ethylenebis(5,6,8-trichloro-3,4-dihydro-2H-1,3-benzoxazine) was dispersed in an aqueous suspension of the spores and mycelial fragments of *Fusarium oxysporum lycopersici* in an amount sufficient to supply 100 parts of weight by the benzoxazine compound per million parts by weight of aqueous suspension. Twentyfour hours later, the treated aqueous suspensions and an untreated check suspension of the fungal organism were cultured on agar and the cultures incubated at 25° C. After three days of incubation, observations showed a substantially complete control of the fungal organism treated with the benzoxazine compound. At the time of the observation, the check cultures were found to support a heavy growth of *Fusarium oxysporum lycopersici*.

I claim:

1. A compound having the formula

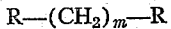

wherein $m$ is an integer from 2 to 6, inclusive and R represents a member selected from the group consisting of the radicals having the formulae

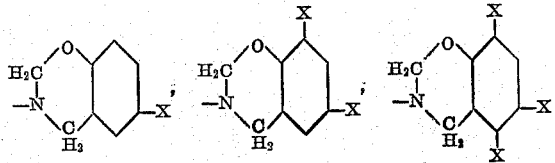

and

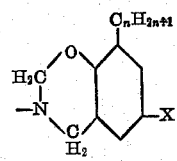

in which X represents a member selected from a group consisting of chlorine and bromine, and $n$ is an integer from 1 to 4, inclusive.

2. 3,3' - ethylenebis(6,8 - dichloro - 3,4 - dihydro-2H-1,3-benzoxazine).

3. 3,3' - ethylenebis(6 - chloro - 3,4 - dihydro-2H-1,3-benzoxazine).

4. 3,3'-ethylenebis(6 - chloro - 3,4 - dihydro-8-methyl-2H-1,3-benzoxazine).

5. 3,3' - ethylenebis(6 - bromo - 3,4 - dihydro-2H-1,3-benzoxazine).

6. 3,3'-ethylenebis(6,8 - trichloro - 3,4 - dihydro-2H-1,3-benzoxazine).

7. A method for the manufacture of a compound having the formula

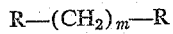

wherein $m$ is an integer from 2 to 6, inclusive, and R represents a member selected from the group consisting of the radicals having the formulae

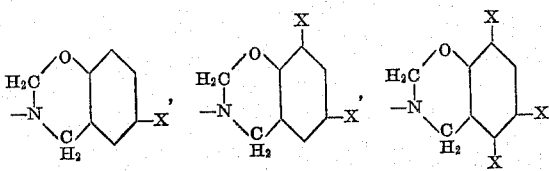

and

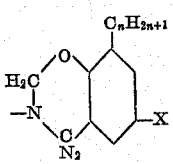

in which X represents a member selected from a group consisting of chlorine and bromine, and $n$ is an integer from 1 to 4, inclusive, which comprises the steps of (1) reacting an alkylenediamine containing from 2 to 6 carbon atoms, inclusive, with formaldehyde to obtain an intermediate formaldehyde amine reaction product, and (2) reacting the intermediate product with a member of the group consisting of 4-halophenol, 2,4-dihalophenol, 2,4,5-trihalophenol and 4-halo-2-loweralkylphenol.

References Cited in the file of this patent

Burke et al.: J. Am. Chem. Soc., 74, 1518–20 (1952).